May 12, 1953  L. F. STORNETTA ET AL  2,638,351
SEED BROADCASTING IMPLEMENT

Filed Feb. 26, 1951  2 Sheets-Sheet 1

Leroy F. Stornetta
James R. Stornetta
Joseph M. Armstrong
INVENTORS

BY *[signatures]*
Attorneys

May 12, 1953  L. F. STORNETTA ET AL  2,638,351
SEED BROADCASTING IMPLEMENT
Filed Feb. 26, 1951  2 Sheets-Sheet 2

Leroy F. Stornetta
James R. Stornetta
Joseph M. Armstrong
INVENTORS

UNITED STATES PATENT OFFICE 2,638,351

SEED BROADCASTING IMPLEMENT

Leroy F. Stornetta and James R. Stornetta, Brentwood, and Joseph M. Armstrong, Byron, Calif.

Application February 26, 1951, Serial No. 212,722

1 Claim. (Cl. 275—8)

This invention relates to an improved agricultural implement, and more particularly to a machine for distributing materials such as pasture legume, grain, seeds, or pellet-form fertilizer, and the like.

The invention comprises a rotary discharge type distributor which is tractor drawn.

It is an object of the invention to provide an improved implement for broadcasting material in the form of particles which comprises multiple rotary material-discharging members which are driven simultaneously by power derived from the movement of the wheels of the machine in contact with the ground.

Another object of the invention is to provide a machine which combines a rotary distributing or broadcasting element with an agitator for feeding material from a hopper to the rotary element.

Still another feature of the invention comprises a feeding hopper having a pentagon-shaped elongated slot, the area of which may be limited to conform to a triangular-shaped slot by a plate which is longitudinally slidable thereover.

Another feature of the invention comprises the provision of a single sprocket and chain drive mechanism for actuating a pair of rotary material-distributing elements which are arranged at opposite sides of the machine beneath the hopper and which cooperate with spaced slots in the bottom thereof.

Various other objects and advantages will be apparent as the invention is described in more detail. The invention itself and its various objects and advantages, and manner of operation, may be better understood by referring to the following description taken in connection with the drawings in which a specific embodiment thereof has been set forth for purposes of illustration:

Figure 1:
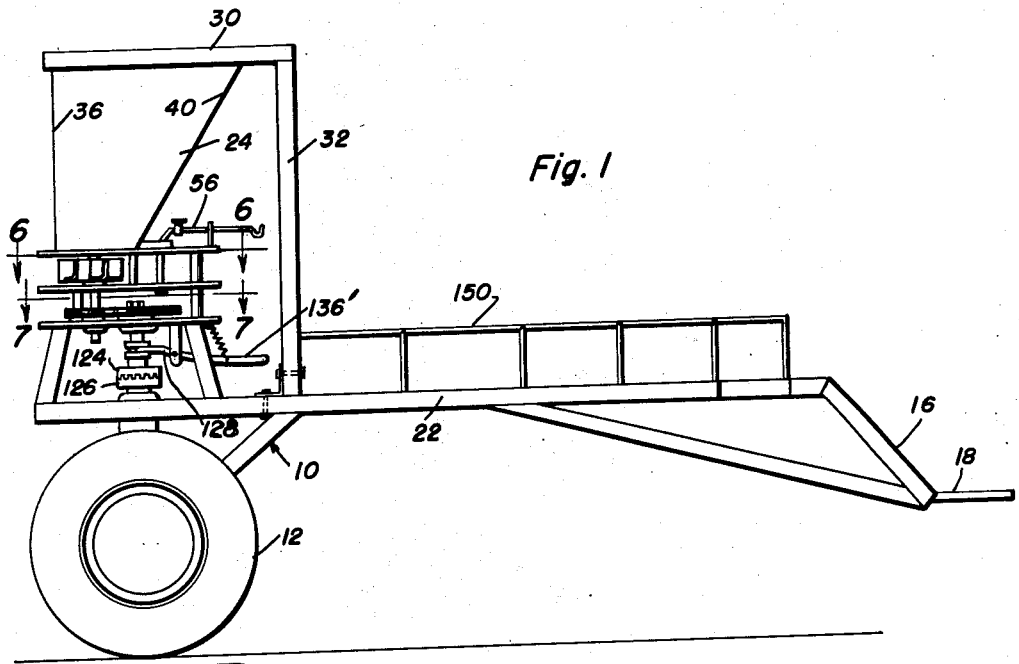
Figure 1 is an elevational view of a machine embodying the novel features of this invention.

Referring to the drawings more in detail and wherein like reference characters refer to like parts throughout the several figures, the reference character 10 designates generally a chassis frame supported on a pair of wheels 12, in turn, mounted on the opposite ends of an axle shaft 14. The forward end of the frame, as at 16, is provided with a tongue 18 having an aperture 20 therein whereby the implement may be suitably hitched to a tractor or the like means for drawing the same therealong.

Figure 2:
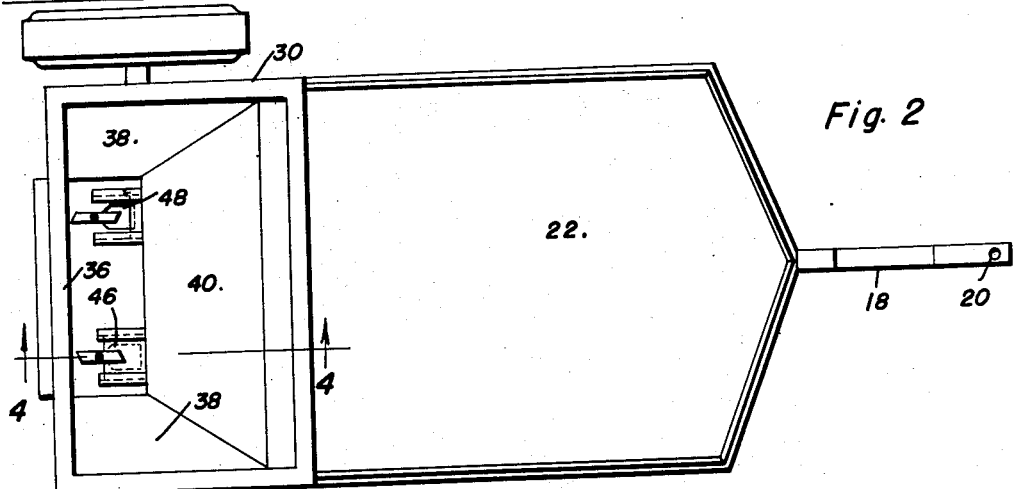
Figure 2 is a plan view of the implement illustrated in Figure 1.
Figure 5:
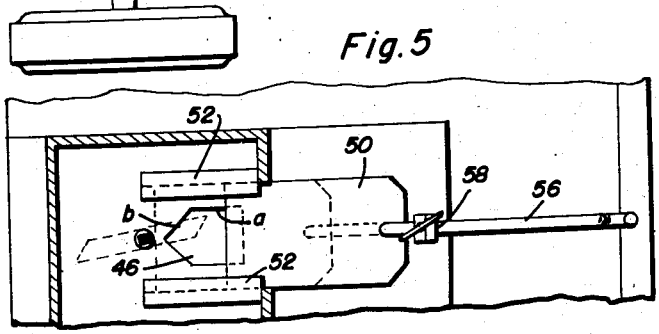
Figure 5 is a fragmentary detail sectional view taken substantially on the line 5—5 of Figure 4 and looking in the direction of the arrows.
Figure 3:
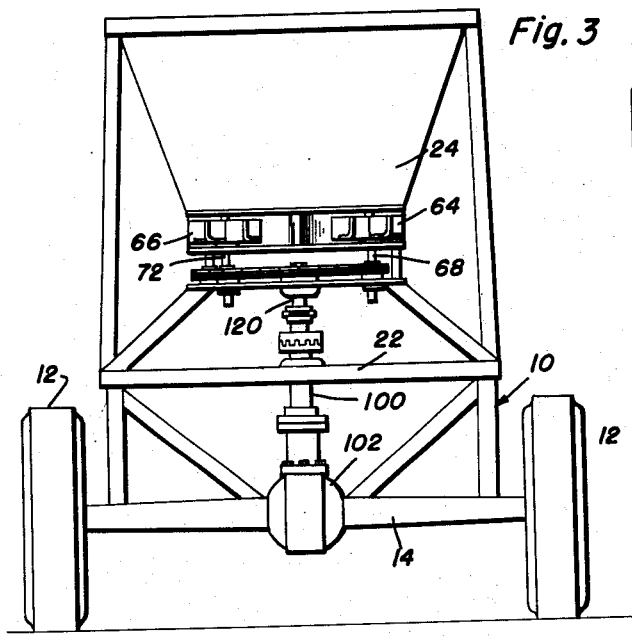
Figure 3 is a rear elevational view of the same.
Figure 6:
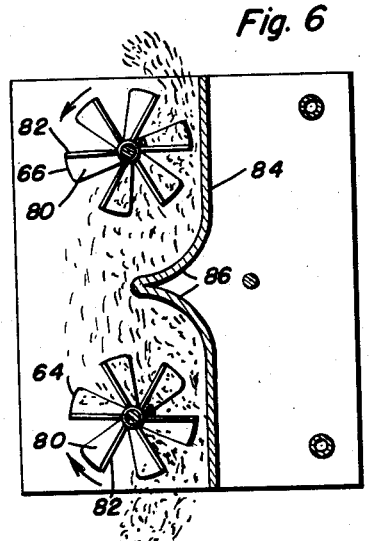
Figure 6 is a detail plan view taken substantially on the line 6—6 of Figure 1 and looking in the direction of the arrows.

Mounted on the chassis frame 10 is an elongated bed 22 which extends over the wheel and axle as shown in Figures 1 and 2. A hopper 24, for receiving and delivering material to be scattered or broadcast, is supported above the bed or platform 22 by a rectangular shaped frame 30 which is secured to a pair of upstanding members 32 which are suitably fixed on the bed 22. The hopper 24 comprises an elongated box which extends transversely of and substantially the full width of the bed 22 and is arranged at the rear of said bed above and between the wheels 12. The hopper comprises a vertical rear wall 36 and contiguous side walls 38, with a sloping front wall 40. At the bottom of the hopper 24 a closure wall 44 is provided which comprises a pair of laterally spaced feeding slots 46 and 48. Each of these slots is pentagon-shaped having two parallel edges, as at $a$ and a pointed or V-shaped end portion $b$ as illustrated in Figure 5.

The areas of the feeding slots 46 and 48 are controlled as desired by providing each slot with a longitudinally slidable plate 50 which is suitably positioned with respect to the slot opening, being slidable toward and away from the pointed end $b$ in the guide members 52 arranged at opposite sides of the plate 50. Adjustment of the plate 50 is effected by a rod or lever 56 which is attached to the end of the plate 50, being slidably retained by an upstanding support 58 arranged on an extension of the plate 44. The lever 56, after adjustment of the plate 50 to the desired position, is secured against further opening movement by an adjustable stop nut 60 on the lever.

Beneath the feeding slots 46 and 48 of the hopper, and arranged to receive material falling therethrough, are rotary propeller members 64 and 66 respectively. The rotary propeller 64 is mounted on the vertically disposed shaft 68, the same being suitably keyed thereto by a key 70.

The rotary member 66 is similarly keyed to a vertically disposed shaft 72, both rotary members 64 and 66 being supported for rotation above the plate 76. Each of the rotary members comprises blades having a laterally extending web portion 80 and a contiguous flange 82 disposed at right angles to the web 80. The blades during rotation of the propellers gather and propel the particles of material as they fall from the hopper through the feeding slots in the bottom closure wall 44. A partitioning wall 84 which is arranged between the plates 44 and 76 comprises an integral reversed curved section 86 for suitably guiding the particles of material being propelled by the rotary members into the path of the propeller blades. Accordingly, seed or the like particles delivered from the hopper 24 through the feeding slots 46 and 48 in the bottom fall onto the rotating propeller members 64 and 66 and are whirled outwardly laterally and rearwardly from the implement as the same is drawn along.

Figure 4:
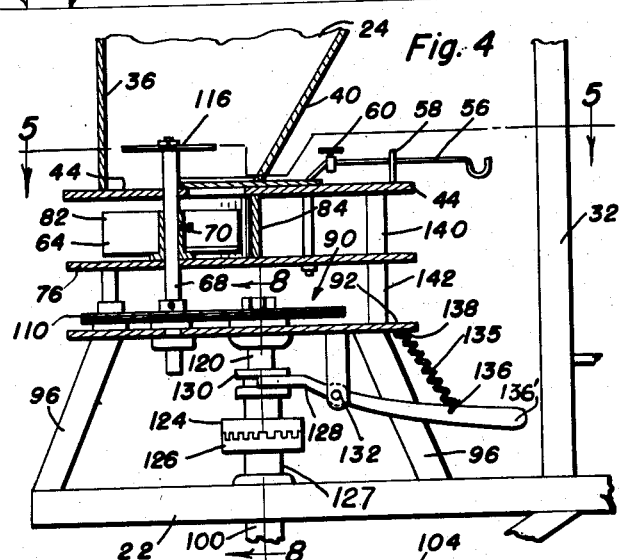
Figure 4 is a vertical sectional view taken substantially on the line 4—4 of Figure 2 and looking in the direction of the arrows.
Figure 7:
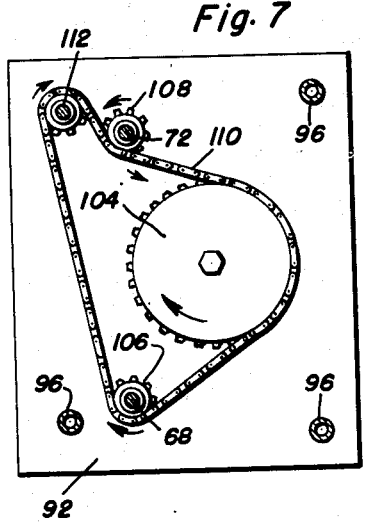
Figure 7 is a similar detail plan view taken substantially on the line 7—7 of Figure 1 and looking in the direction of the arrows.

For rotating the propeller members 64 and 66, a sprocket and chain drive mechanism is provided, as indicated generally at 90 in Figure 4, the same being mounted on top of the plate 92, which in turn, is supported above the bed 22 by the frame members 96. A vertically disposed drive shaft 100 is operatively connected through a conventional ring gear and pinion mechanism to the axle shaft 14 in the housing 102, the wheels 12 being suitable keyed to the axle 14 whereby rotation of the wheels drives the vertical shaft 100. This latter shaft is arranged to drive the shaft 120 through a clutch mechanism, generally indicated at 101. A sprocket wheel 104 is fixed to the upper end of the shaft 120 and is driven thereby. This sprocket is operatively connected to the sprocket pinions 106 and 108 on the shafts 68 and 72, respectively, by a chain 110. A reversing idler sprocket 112 is disposed between the sprocket pinions 106 and 108 whereby the chain is adapted to rotate the propellers 64 and 66 clockwise and counter-clockwise, respectively, when the sprocket 104 is driven in a clockwise direction, as illustrated by the arrows in Figure 7.

Each of the driven shafts 68 and 72 extends upwardly through the bottom closure plate 44 and into the hopper 24, and is provided with a blade means 116 which rotates with the respective propeller drive shaft to effectively stir or agitate the material in the hopper 24 so that the material will flow evenly through the feeding slots 46 and 48.

Figure 8:
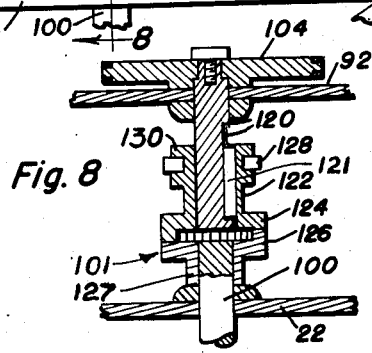
Figure 8 is a detail vertical sectional view taken on the line 8—8 of Figure 4 and looking in the direction of the arrows.

The clutch mechanism 101 for connecting and disconnecting the drive shaft 100 from the sprocket shaft 120 is of conventional construction. As illustrated in Figure 8, the clutch mechanism comprises a sleeve 122 which is adapted to slide axially on the shaft 120 while keyed thereto as at 121. On the lower end of the sleeve 122 gear teeth 124 are provided which are adapted to engage complementary teeth 126 on the opposed end of the sleeve 127 suitably fixed to the drive shaft 100. To disconnect the shafts 100 and 120 through the clutch 101, a shifting fork or lever 128 is provided which is arranged to work in the collar 130 and pivot about a fulcrum 132. Pressing down on the handle 136' of the lever 128 forces the sleeve to slide upwardly on the shaft 120 so as to disengage the teeth 124 and 126. A coil spring 135 is suitably fastened to the outer portion of the lever 128, as at 136, and at its opposite end to the underside of the plate 92, as at 138, and normally operates to maintain the clutch parts engaged so as to operate the propeller members when the implement is drawn along.

As illustrated in Figure 4, the vertically spaced plates 44, 76 and 92 are suitably secured together by the members 140 and 142, there being no interfering supports or structure in the propeller compartments as defined by the partitioning wall 84 and spaced plates 44 and 76. The material to be broadcast or uniformly distributed from the hopper 24, is conveniently placed in sacks or other suitable receptacle means and arranged on the bed platform 22 forward of the hopper 24, the bed being preferably provided with guard rails 150. The hopper can thus be filled as needed from the storage receptacle by an operator who may be stationed on the platform of the implement.

During operation of the implement, when the plates 50 are suitably positioned to provide the desired feed slot openings in the bottom of the hopper 24, and the material to be broadcast is introduced in the hopper, and the propellers 64 and 66 operated, material flows from the hopper onto the rotating propeller blades and is thrown outwardly and evenly from both sides of the implement as the same is moved along over the ground. When it is desired to stop the rotation of the propellers 64 and 66 it is only necessary to press downwardly on the handle 136' of lever 128 so as to declutch the driven shaft 120 from the drive shaft 100. In this manner the implement may be drawn along without operation of the propellers.

From the above description and illustration it will be appreciated that the invention provides an implement whereby pellets of material can be delivered from a hopper in controlled amounts through a plate controlled valve or slot in the bottom of the hopper onto rotating blade members, to thereby scatter the material uniformly outwardly from the rear and side of the implement. In this manner an evenly distributed scattering of the material is provided and a simplified mechanism for driving a plurality of rotary blade members positioned at opposite sides of the implement.

While in the foregoing description there has been shown and described the preferred embodiment of the invention, it will be understood, of course, that minor changes in the details of construction, and substitution may be made in the combination and arrangement of the parts without departing from the spirit and scope of the invention as claimed hereinafter.

Having described the invention, what is claimed as new is:

A material distributing machine comprising a bed, supporting wheels mounted beneath said bed, a frame structure on the bed, a hopper on said frame structure spaced above the bed, vertically spaced upper, lower and intermediate horizontal plates mounted in elevated position on the bed beneath the hopper, said upper plate constituting the bottom of said hopper and having a pair of discharge openings therein communicating therewith, a pair of vertical shafts journalled on the plates and projecting into the hopper, agitators on the upper end portions of said shafts operable in the hopper, centrifugal scatterers fixed on the shafts between the upper and intermediate plates, transversely disposed baffle plate for the material vertically mounted between said upper and intermediate plates forwardly of said scatterers and including a substantially V-shaped intermediate portion projecting between said scatterers, slide valves on said upper plate controlling the discharge openings, a drive shaft journalled in the lower plate, chain and sprocket means between the lower and intermediate plates operatively connecting said drive shaft to the first named shafts, and clutch controlled means operatively connecting the supporting wheels to the drive shaft.

LEROY F. STORNETTA.
JAMES R. STORNETTA.
JOSEPH M. ARMSTRONG.

References Cited in the file of this patent

UNITED STATES PATENTS

| Number | Name | Date |
|---|---|---|
| 241,924 | Buswell | May 24, 1881 |
| 1,166,477 | Parrish | Jan. 4, 1916 |
| 1,285,183 | Holden | Nov. 19, 1918 |
| 1,733,722 | Cotner | Oct. 29, 1929 |
| 1,829,627 | Bamford et al. | Oct. 27, 1931 |
| 2,451,128 | Thiesse | Oct. 12, 1948 |
| 2,537,913 | Rimple | Jan. 9, 1951 |
| 2,562,422 | Herd | July 31, 1951 |